United States Patent
Fortier et al.

(10) Patent No.: US 6,248,683 B1
(45) Date of Patent: Jun. 19, 2001

(54) PROCESS FOR THE REGENERATION OF USED SILICA GEL

(75) Inventors: Luc Fortier, Charlesbourg; Simon Côté, Ste-Foy; Hugo St-Laurent, Québec; Simon Bernier, Ancienne-Lorette; André Couture, St-Roch-des-Aulnaies, all of (CA)

(73) Assignee: Silicycle Inc., Quebec (CA)

( * ) Notice: Subject to any disclaimer, the term of this patent is extended or adjusted under 35 U.S.C. 154(b) by 0 days.

(21) Appl. No.: 09/287,374

(22) Filed: Apr. 7, 1999

(51) Int. Cl.[7] ................................................. B01J 20/34
(52) U.S. Cl. ............................. 502/20; 502/21; 502/27; 502/29; 423/335
(58) Field of Search ................................. 423/335, 340; 502/20, 21, 27, 29, 516, 518

(56) References Cited

U.S. PATENT DOCUMENTS

| | | | |
|---|---|---|---|
| 3,917,733 | 11/1975 | Winter | 260/674 SA |
| 4,008,289 | 2/1977 | Ward et al | 260/671 R |
| 4,008,994 | 2/1977 | Numasaki et al. | 432/14 |
| 4,137,154 * | 1/1979 | Audeh . | |
| 4,261,805 | 4/1981 | Galliker et al. | 204/157.44 |
| 4,391,586 * | 7/1983 | Brown . | |
| 4,401,638 | 8/1983 | Caballero et al. | 423/340 |
| 4,402,883 | 9/1983 | Anzenberger | 260/990 |
| 4,404,118 | 9/1983 | Herskovits | 252/411 R |
| 4,575,566 | 3/1986 | Vora | 568/697 |
| 4,676,964 | 6/1987 | Seki et al. | 423/335 |
| 4,725,621 * | 2/1988 | Bunge et al. . | |
| 4,786,418 * | 11/1988 | Garg et al. . | |
| 4,861,484 | 8/1989 | Lichtin et al. | 210/638 |
| 4,971,606 | 11/1990 | Sircar et al. | 55/25 |
| 5,182,030 * | 1/1993 | Crittenden et al. . | |
| 5,187,131 | 2/1993 | Tiggelbeck et al. | 502/34 |
| 5,211,215 | 5/1993 | Sommer | 164/5 |
| 5,227,598 | 7/1993 | Woodmansee et al. | 219/10.55 R |
| 5,230,791 | 7/1993 | Sherwood | 208/213 |
| 5,245,008 * | 9/1993 | Dickhardt et al. . | |
| 5,273,629 | 12/1993 | Meenan et al. | 204/131 |
| 5,370,004 * | 12/1994 | Bossart et al. . | |
| 5,462,570 | 10/1995 | Balcar et al. | 65/17.1 |
| 5,496,392 | 3/1996 | Sims et al. | 75/414 |
| 5,540,270 | 7/1996 | Grote et al. | 164/5 |
| 5,618,223 | 4/1997 | Masuno et al. | 451/103 |
| 5,706,879 | 1/1998 | Renner et al. | 164/5 |

* cited by examiner

*Primary Examiner*—Ngoc-Yen Nguyen
(74) *Attorney, Agent, or Firm*—Swabey Ogilvy Renault; Christian Cawthorn

(57) ABSTRACT

The present invention is concerned a process for the regeneration of the spent silica gel used in chromatography and for any other kind of silica. The process comprises 5 main steps, namely:
washing with an extractant of organic compounds and removing volatile organic materials remaining thereafter;
oxidation to oxidize organic compounds remaining and, preferably, bleach the material;
washing with an acid to remove soluble inorganic matter;
heating to dry the material and combust any remaining organic compounds present; and
recovering the regenerated material.
Various optional steps can be added to the process.

12 Claims, No Drawings

PROCESS FOR THE REGENERATION OF USED SILICA GEL

FIELD OF THE INVENTION

The present invention relates to a process for the regeneration of particulate materials such as silica, silica gel, alumina, and the like. These materials are commonly used in the field of chemistry, and contaminated mostly with organic solvents, organic compounds and/or heavy metals. The present process allows the decontamination of the material without degradation thereof.

BACKGROUND OF THE INVENTION

Silica gel chromatography is a universal purification technique in organic synthesis, and perhaps one of the most practiced. Accordingly, huge quantities of spent silica gel are generated yearly by laboratories in universities and research centers. Examples of contaminants in industrial spent silica gel include organic solvents, organic compounds, heavy metals, sand, polystyrene and/or polyethylene glycol based resins, vermiculite, thin layers plates, desiccants like sodium and magnesium sulfate, molecular sieves, as well as other adsorbents like alumina, Celite™ and Kieselguhr™, activated carbon, Florisil™, and chemically modified silica gels ($C_{18}$, $C_8$, amino, diol, etc.). Because waste silica is generally disposed of in large bins, it not unusual to find therein foreign objects like gloves, syringes, needles, flasks, magnetic stirrers, labels, filter papers, hand paper, septa, broken glass, cotton, glass wool, chemical product bottles etc. As a result, spent silica gel is classified as a hazardous waste and poses serious environmental problems.

Because of its relatively low cost, little attention has been paid to silica gel regeneration in the past. Also, although large volumes of silica gel are generated each year, the volume per company is generally not sufficiently important to warrant the investment of developing advanced regeneration technologies internally. It is well known that silica is relatively stable in strongly acidic media or when heated at high temperatures. Because of its high temperature stability, most regeneration processes developed in the past proposed a simple heat treatment, alone or in combination with acid washing. Examples of such processes include those disclosed in U.S. Pat. No. 4,676,964; U.S. Pat. No. 4,401,638 and U.S. Pat. No. 4,008,994.

Gas stripping has been used on many adsorbents for regeneration purposes, for example in U.S. Pat. No. 5,227,598; U.S. Pat. No. 5,187,131; U.S. Pat. No. 4,971,606; U.S. Pat. No. 3,917,733; U.S. Pat. No. 4,008,289; U.S. Pat. No. 4,575,566 & U.S. Pat. No. 4,404,118. This process has serious limitations since it is effective inasmuch the contaminants are known. Microwaves are also known to be effective for the desorption of contaminants on adsorbents or simple drying thereof. This technology requires significant capital investment to acquire the equipment, and the electricity requirements are substantial.

Oxidation of organic contaminants on adsorbents has been performed by hydrogen peroxide or hydroxyl radicals generated in situ, for example in U.S. Pat. No. 4,012,321 ($H_2O_2$/UV); U.S. Pat. No. 4,861,484 ($H_2O_2$/catalyst); U.S. Pat. No. 4,261,805 ($H_2O$/$O_2$/X-rays); U.S. Pat. No. 5,182,030 ($H_2O_2$/light after adsorption of a photoreactor). Again, these processes can be effective only to the extent that the contaminants are known. They are therefore highly specific, and also require complex and costly equipment.

Drying of the final silica gel, whether regenerated under current technologies or freshly prepared, can be done in many ways, direct heating being the most commonly used method. The use of water miscible solvents like alcohols or ketones with further heating to remove residual solvent at temperatures below 100° C. are also known.

All the above processes have their drawbacks. The combination acid treatment-heat treatment produces, after the first acid treatment, a highly contaminated aqueous effluent because of the presence of significant concentrations of degraded organic wastes. In fact, acidic degradation generates highly polar, non-water soluble organic compounds with much greater affinity for silica than for water. The heat treatment, in addition to having high oxygen requirements, thus results in incomplete combustion of the organic compounds, still present in relatively high concentrations even over extended periods of time and after the acid washing. Furthermore, black carbon decomposition products are generated during the process.

The combination organic solvent treatment-heating treatment is ineffective when the silica gel contains inorganic contaminants like heavy metals, because the latter are generally insoluble in organic solvents. The inorganic contaminants will therefore accumulate in the silica overtime. Further, such method requires on-site, specific segregation of used silica gel to determine the nature and extent of the contaminant(s). As stated above, only small volumes can be treated at the same time.

In view of the above, there is therefore a great need to develop a universal process for the regeneration of contaminated particulate materials like silica, silica gel, alumina, clays, silicate materials, sand and the like. Such process should be able to regenerate the materials in a manner such that its properties are at least as good as the virgin materials available on the market, whatever the nature and number of contaminants present originally in the contaminated material.

SUMMARY OF THE INVENTION

In accordance with the present invention, there is now provided a process for the regeneration of particulate materials like silica, silica gel, alumina, clays, silicate materials, sand and the like, the process comprising the steps of:

a) contacting the material with an extractant of organic compounds for a period of time sufficient to dissolve the organic compounds, carrying out a solid-liquid separation, and heating to remove substantially all extractant from the particulate material;

b) contacting the material obtained from step a) with an oxidizing agent, and optionally carrying out a solid-liquid separation;

c) contacting the material obtained from step b) with an acidic solution to extract inorganic compounds, metals and metal salts, and carrying out a solid-liquid separation;

d) heating the material obtained from step c) to a temperature sufficiently high to evaporate water and combust carbon-containing compounds; and e) recovering regenerated material.

The process also comprises optional steps, namely:

screening of the material prior to step a) to remove foreign objects and solid wastes;

heating the material prior to step a) to evaporate volatile organic compounds;

suspension, elutriation, flotation or combinations thereof, following step c);

drying the material following step c);

neutralizing the material after step d) followed by a drying step; and moisturizing and homogenizing the material recovered from step e).

The present process is particularly advantageous for the regeneration of contaminated silica and silica gel.

DETAILED DESCRIPTION OF THE INVENTION

The present invention is concerned with a process for the regeneration of contaminated particulate materials like silica, silica gel, alumina, and the like, conventionally used in chemistry, and particularly in chromatography. Such waste materials are generally contaminated with organic solvents, organic compounds, heavy metals, etc. The present process comprises 5 main steps to which several optional steps can be added, if required. The 5 main steps comprise:

washing with an extractant of organic compounds and removing volatile organic materials remaining thereafter;

oxidation to oxidize organic compounds remaining and, preferably, bleach the material;

washing with an acid to remove soluble inorganic matter;

heating to dry the material and combust any remaining organic compounds present; and recovering the regenerated material.

Although the present process can also be applied to alumina, other silicate-containing materials, and various clays, the invention will be described and illustrated by referring to the application to the regeneration of silica gel.

Spent silica gel may contain foreign objects and materials depending on its origin. It is therefore preferred that a simple screening be carried out initially if one notices the presence of such foreign species. The screened silica gel is then washed with an extractant of organic compounds, preferably an organic solvent, to remove as much as possible the organic matter present. The pregnant extractant may thereafter be recovered by conventional distillation and used again later. The silica gel is also heated to remove any volatile organic matter.

Subsequently, the next operation involves an oxidation of non-dissolved organic matter and the bleaching of the silica gel by an oxidant, preferably in hot water. Preferred oxidants include those not introducing further contaminants in the silica gel. In addition to washing the silica gel, this step allows the oxidation, e.g., destruction, of the contaminants in situ. After a solid-liquid separation, the resulting aqueous waste can then be treated in a conventional manner and directly released to the environment.

The next step extracts the inorganic species, i.e. metals and their salts, by washing with an acid, preferably inorganic, or a mixture of acids, optionally in hot water. After a solid-liquid separation, the aqueous effluent produced from this step is neutralized and treated in a conventional manner, for example by precipitating the heavy metals as hydroxides and filtering, before being released into the environment.

Finally, the silica gel is heated to a temperature sufficiently high to dry it and oxidize any residual organic matter or any other carbon-containing matter. To achieve this, the silica gel is homogenized at temperature between 20 and slightly over 100° C. to remove the water, and then heated between about 200° C. and 800° C., preferably from about 550° C. to 650° C. This treatment results in the production of carbon dioxide and water.

The thus obtained silica gel is slightly acidic. Depending on the intended use, it may be necessary to neutralize it until a pH approaching neutrality, i.e., pH 7, is obtained. One should be careful not to contaminate the silica gel during this step. Accordingly, it is preferred that the neutralization be carried out with pure demineralized water. The activity of the resulting silica gel can then be adjusted by varying the moisture content through the addition of demineralized water.

The following is a more detailed description of each step of the present process, including optional steps.

Screening of Spent Silica Gel (Optional)

An optional preliminary screening of the spent silica gel is performed to remove any foreign objects or solid waste present. This includes all waste from other sources outlined supra, except for finer desiccants. A second finer screening can be carried out to remove any Ottawa sand and granular desiccants such as molecular sieves, magnesium and sodium sulfate that may be present.

Extraction of Organic Compounds

Organic compounds, which includes organic solvents, are the main source of contamination in spent silica gel. The first step comprises washing the silica gel with an extractant solubilizing the organic compounds to extract them. Preferred extractants for this purpose comprise acetone, ethanol, hexamethylphosphoramide (HMPA), methanol, N,N-dimethylformamide (DMF), acetonitrile, dimethylsulfoxide (DMSO), nitromethane, N-methylpyrrolidone (NMP), formic acid, sulphuric acid water, glycols, halogenated solvents like chloroform, dichloromethane, trichloroethylene and the like, ethers, alcohols, amines, amides, tetrahydrofuran (THF), dioxanne, ethylacetate, pyridine, formic acid, acetic acid, propionic acid, alkanes, aromatics like benzene, toluene, xylenes, mesitylene and the like. The above extractants can be used in admixtures, when compatible. As an alternative, rather than mixing them, they can each be the subject of an independent extraction, separated by a solid-liquid separation, thus leading to an organic compound removal step comprising several sub-steps. In a preferred embodiment, the step is repeated at least twice with the same or different extractant or mixture of extractants, to maximize the extraction yield.

Gases such as sulfur dioxide ($SO_2$), chlorine ($Cl_2$) and others gases in supercritical conditions, such as $CO_2$, ammonia, butane, propane, ethane and the like, can also be used as extractants, either in the gaseous or liquid state. These technologies are well-known, and can be used alone, or in combination with another organic cosolvent.

In the present process, formic acid, acetone and methanol are preferred extractants, formic acid being the most preferred because of its high dielectric constant and solubilizing properties. These properties allow the extraction of amines, other highly polar compounds and, in some instances, metallic species. While dissolving the organic compounds, formic acid can also oxidize some non-water soluble substances, such as alkenes, which are converted to carboxylic acids. The latter are generally more soluble in formic acid or in water. Another advantage of formic acid is that it has a relatively low boiling point (100–101° C.), which renders it easily distillable.

After a solid-liquid separation, a dry or aqueous distillation of the silica gel, preferably under reduced pressure, allows the evaporation of volatile organic compounds and extractant therein. Air stripping and steam distillation can also replace the reduced pressure distillation.

In a more preferred embodiment, a dry distillation of the silica gel is carried out under reduced pressure to remove any volatile organic compounds before the extraction step. As a result, the volume of extractant required for washing the silica will be significantly lower, since the concentration of organic compounds will be much lower.

Oxidation

Following the organic compounds removal step, the silica gel generally contains only a few percents thereof. However, various other contaminants, mainly inorganic, remain adhered to the silica gel. Extensive experimentation has shown that at this point, any further treatment with an extractant used in the first step is useless to remove whatever organic compounds that are still present. To be extractable, the latter therefore have to be oxidized, without affecting the properties of the silica gel. Such oxidation may also oxidize part of the inorganic materials, resulting in inorganic oxidized compounds having an increased solubility in acidic media, which is a beneficial effect for the next step of the process.

Suitable oxidizing agents comprise oxygen in its triplet and singlet states, or any reagent or conditions able to form the singlet specie, such as for example, $H_2O_2/NaClO$, $O_2$ ultra-violet excitation, etc.; ozone; hydrogen peroxide; hydroxyl radical precursors such as $H_2O_2$-heating, $H_2O_2$-UV, supercritical water, $O_2/H_2O/X$-ray and water sonification; compounds of formula $XYO_z$ wherein z varies from 1–4, X is an alkaline metal or earth metal and Y is a halogen; chlorine, bromine or iodine, or any precursor thereof in situ, such as an acid and hypochlorite in aqueous and dry medium, $Cl_2O$, $ClO_2$ and $Cl_2O_7$; aqua regia; heavy metal oxidant derivatives such as $CrO_3$, $K_2Cr_2O_7$, $KMnO_4$ and the like; Caro's acid; oxones ($2KHSO_5KHSO_4K_2SO_4$); mono and persulfate derivatives (i.e. $Na_2S_2O_8$); and per-acids like per-formic, per-acetic and m-chloro-per-benzoic (m-CPBA) acid.

Because of its strong oxidizing power and well-known bleaching properties, hydrogen peroxide is the most preferred oxidizing agent. The bleaching effect is not necessarily a prerequisite of the present invention. However, for marketing purposes, the degree of whiteness of the final product represents an important factor. In a most preferred embodiment, an oxidizing step according to the present invention is carried out as follows.

In a reactor, an aqueous solution of hydrogen peroxide is added to the silica gel and the mixture is then heated to a temperature sufficiently high for the oxidation to take place effectively, typically between 50 and 135° C., and preferably around 80–90° C. When this temperature is reached, the mixture is agitated without further external heating for about 1–2 hours. As the temperature slowly returns to room temperature, a solid-liquid separation is carried out, and the silica gel is washed with demineralized water to remove any water soluble impurities remaining.

It has also been found that the addition of acid during the oxidizing step increases the oxidizing power of the oxidizing agent. A direct benefit from this addition is the heat reduction requirement to initiate and maintain the oxidation reaction, which is exothermic. The oxidizing power is increased because the oxidizing agent oxidizes the acid to the per-acid state, which has an oxidizing power greater than that of the peroxide, and thus capable of oxidizing more stable organic functionalities. The increased water solubility of the resulting products makes them easier to remove.

Acidic Extraction of Heavy Metals

Inorganic acids are obviously preferred for dissolving inorganic matter like heavy metals or metal salts. Although the use of organic acids can be envisaged for that purpose, they are considerably less effective, and can form insoluble metal salts.

Hydrochloric acid, nitric acid, perchloric acid and sulfuric acid are known to effectively dissolve various heavy metals and metal salts. Perchloric acid is however more hazardous to handle on an industrial scale, while sulphuric acid may in some instances generate water insoluble sulfates. For the purposes of the present invention, hydrochloric acid and nitric acid are preferred, since most nitrate and chloride salts produced are soluble in water. To ensure complete removal of metallic species, it is preferred to conduct a sequence of two treatments, in no particular order, with hydrochloric acid and nitric acid independently, or conduct the extraction with a mixture of both acids. In fact, it has been found that a single treatment with the mixture of hydrochloric and nitric acids is particularly effective since the medium is not only strongly acidic but also a powerful oxidant due to the presence of $Cl_2$ and $ClNO$ generated in situ during the extraction. These species can dissolve most metals or metal salts.

To exemplify this step, silica gel is treated with nitric acid under agitation in hot water for about an hour during which most metals and metal salts will be dissolved. While maintaining the temperature between 20 and 100° C., preferably around 80° C., hydrochloric acid is added to form a dilute mixture (also known as aqua regia) with unreacted nitric acid remaining. The resulting presence of $Cl_2$, HCl and ClNO allows the dissolution of remaining metals and metal salts. Heating is continued under agitation for another hour more or less. The mixture is then cooled and a solid-liquid separation is carried out, and the silica gel is washed with demineralized water to eliminate any metal or metal salt remaining.

Suspension, Elutriation, and Flotation (All Optionals)

At this stage, the silica gel may still contain other particulate matter such as finer sand, activated carbon and Celite™. Because these compounds have a particle size similar to that of silica gel, or even finer, simple screening is not a viable option. However, sand settles to the bottom of the reactor because of its higher density. Celite™ and activated carbon having a density lower than that of silica gel, removal thereof is possible by suspension and elutriation. Suspension is performed by suspending the silica gel in water with a stream of tiny air bubbles introduced via a diffuser located at the bottom of the reactor. The air stream is stopped and the silica gel allowed to settle. Low density particles remain suspended in the supernatant water and can then be decanted by suction or by means of an outlet valve placed above the silica gel deposit level.

Elutriation is then effected by adding silica gel to a reactor where a stream of water from the bottom flushes out residual, finer, low density particles. The silica gel settles at the bottom of the reactor where it will be drained out for filtering and further drying.

Flotation allows the removal of hydrophobic materials like activated carbon, a physical characteristic not shared by the silica gel. The very small air bubbles adsorb the hydrophobic material on their surface rather than the silica gel, and this carries the particles up to the top of the reactor, where they can be removed.

Drying (Optional)

At this point, the silica gel may contain up to 150% w/w of water. It is therefore preferably dried before the next step, although such drying is not mandatory. Typically, the silica gel is dried by heating the material under reduced pressure in a tumble dryer for several hours.

High Temperature Combustion

It is possible that very stable species like polynuclear aromatic compounds be generated during the oxidation step. To remove such aromatic compounds, combustion at high temperature in the presence of air or oxygen effectively burns such carbon-containing material. The temperature should be at least 200° C. while not too high however, to avoid damaging to the silica gel, i.e., preferably not higher than 800° C. A preferred temperature range is between 550 and 650° C. In the case of silica gel, it is important to note however that if the preceding optional drying step is not carried out, the temperature should be first raised slowly between 50 and 150° C. for a period of time sufficient to evaporate water. This precaution is not required for other materials like alumina, other silicates, clays and sand.

The combustion is performed in a reactor under agitation, and the temperature is raised to between about 550 and 650° C. In a preferred embodiment, the reactor is a rotary oven with a temperature gradient reaching an internal oven temperature around 650° C. at the end of the treatment.

Neutralization (Optional)

It is well known that high temperatures render silica gel acidic in water, e.g., pH range between 5.5 to 6.5 for a 10% aqueous suspension. To bring the pH back to neutral, a dilute basic solution is added to a suspension of the heated silica gel in demineralized water. Preferred bases for this purposes comprise hydroxides like sodium hydroxide, potassium hydroxide, ammonium hydroxide and the like. Once the silica is neutral, a solid-liquid separation is carried out and the silica gel is washed with demineralized water.

Drying (Optional)

If a neutralization step is carried out, an ultimate drying step will be required. Such drying is carried out as described above until the desired water concentration is achieved. Such content is determined by the intended use of the silica gel.

Moisturizing and Homogenization (Optional)

The moisture content is critical for the silica gel's activity in chromatography. Too much water adsorbed on the surface of the silica gel particles decreases the polar attraction between the silica gel and the chemical compounds to be purified. As a result, the rate of elution increases, and the purity of the compounds can be affected. Conventional silica gels available on the market, as used for example in chromatography, have a 9 to 10% moisture content, which corresponds to "activity II" on the Brockmann activity scale. The addition of demineralized water is achieved by mixing the silica gel in a controlled humidity-temperature tumble dryer until the correct water content is reached. The final product may be screened, if required by the customer, to the selected particle size, if necessary.

Table 1 below illustrates the concentration of various elements in a silica gel regenerated in accordance with the process of the present invention, and the concentration of the same elements in a few commercially available silica gels.

| Element | Present Invention | Gel no. 1 | Gel no. 2 | Gel no. 3 |
|---|---|---|---|---|
| Fe | 30 ppm | 205 | 60 | 80 |
| Pb | 0.5 ppm | 2.1 | 1.12 | 2.96 |
| Cu | <1 ppm | 5.6 | 0.38 | 100 |
| Zn | 2 ppm | 53 | 2 | 1 |
| Cd | <0.1 ppm | 0.11 | 0.10 | 0.10 |

While the invention has been described in connection with specific embodiments thereof, it will be understood that it is capable of further modifications and this application is intended to cover any variations, uses or adaptations of the invention following, in general, the principles of the invention and including such departures from the present description as come within known or customary practice within the art to which the invention pertains, and as may be applied to the essential features hereinbefore set forth, and as follows in the scope of the appended claims.

What is claimed is:

1. A process for the regeneration of a particulate material comprising silica, silica gel, alumina, silicate materials, clays or sand, comprising the steps of:

a) contacting the material with an extractant of organic compounds for a period of time sufficient to dissolve the organic compounds, carrying out a solid-liquid separation, and heating to remove substantially all extractant from the particulate material;

b) contacting the material obtained from step a) with an oxidizing agent, and optionally carrying out a solid-liquid separation; wherein the oxidizing agent is selected from the group consisting of oxygen in its triplet or singlet states; ozone; hydrogen peroxide; hydroxyl radical precursors; compounds of formula $XYO_z$ wherein z varies from 1–4, X is an alkali metal or alkaline earth metal and Y is a halogen; chlorine, bromine or iodine, or any precursor thereof; aqua regia; a heavy metal oxidant: Caro's acid; oxones; mono and persurfate derivatives; per-acids; and compatible mixtures thereof;

c) contacting the material obtained from step b) with an acidic solution to extract inorganic compounds, metals and metal salts, and carrying out a solid-liquid separation;

d) heating the material obtained from step c) to a temperature sufficiently high to evaporate water and combust carbon-containing compounds; and e) recovering regenerated material.

2. A process according to claim 1 wherein removal of extractant in step a) is carried out by distilling the particulate material until substantially all extractant has been distilled.

3. A process according to claim 1, wherein an acid is added during oxidizing step b).

4. A process according to claim 1, wherein the extractant is selected from the group consisting of acetone, ethanol, HMPA, methanol, glycols, sulphuric acid, DMF, acetonitrile, DMSO, nitromethane, N-methylpyrrolidone, formic acid, water, halogenated solvents, ethers, alcohols, amines, amides, THF, dioxanne, ethylacetate, pyridine, formic acid, acetic acid, propionic acid, alkanes, aromatics, and compatible mixtures thereof.

5. A process according to claim 1, wherein the acidic solution is selected from the group consisting of hydrochloric acid, nitric acid, perchloric acid, sulphuric acid, or mixtures thereof, and wherein step c) is carried out under a temperature varying between 20 and 100° C.

6. A process according to claim 1, wherein step d) is carried out under a temperature varying from 200 to 800° C.

7. A process according to claim 1 further comprising one or more of the following optional steps:

screening of the material prior to step a) to remove foreign objects and solid wastes;

heating the material prior to step a) to evaporate volatile organic compounds;

suspension, elutriation, flotation or combinations thereof, following step c);

drying the material following step c);

neutralizing the material after step d) followed by a drying step; and moisturizing and homogenizing the material recovered from step e).

8. A process according to claim 7, wherein neutralization of the material after step d) is achieved with an aqueous solution of sodium hydroxide or potassium hydroxide.

9. A process for the regeneration of silica gel comprising the steps of:
   a) contacting the silica gel with formic acid, methanol, acetone or mixture thereof, for a period of time sufficient to dissolve organic compounds, carrying out a solid-liquid separation followed by a dry distillation of the silica gel;
   b) contacting the silica gel obtained from step a) with a hydrogen peroxide solution, and carrying out a solid-liquid separation;
   c) contacting the silica gel obtained from step b) sequentially with a solution of nitric acid, a solution of hydrochloric acid, or a mixture thereof, to extract inorganic compounds, metals and metal salts, and carrying out a solid-liquid separation;
   d) heating the silica gel obtained from step c) to evaporate water and combust any carbon-containing product present; and
   e) recovering regenerated silica gel.

10. A process according to claim 9, wherein an acid is added during oxidizing step b).

11. A process according to claim 9 further comprising one or more of the following optional steps:

screening of the silica gel prior to step a) to remove foreign objects and solid wastes;

carrying out a dry distillation of the material prior to step a) to remove volatile organic compounds;

suspension, elutriation, and flotation of the silica gel following step c);

drying the silica gel following step c);

neutralizing the material after step d) followed by a drying step; and moisturizing and homogenizing the silica gel recovered after step e).

12. A process according to claim 11, wherein the neutralization is achieved with an aqueous solution of sodium hydroxide or potassium hydroxide.

* * * * *